United States Patent
Bastide et al.

(10) Patent No.: US 10,284,513 B2
(45) Date of Patent: *May 7, 2019

(54) OBTAINABILITY MANAGEMENT IN A SOCIAL NETWORKING ENVIRONMENT

(71) Applicant: INTERNATIONAL BUSINESS MACHINES CORPORATION, Armonk, NY (US)

(72) Inventors: Paul R. Bastide, Boxford, MA (US); Chun Li Jia, Beijing (CN); Shu Qiang Li, Beijing (CN); Na Pei, Beijing (CN); Pei Sun, Beijing (CN); Chen XR Tian, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/584,515

(22) Filed: May 2, 2017

(65) Prior Publication Data
US 2018/0324135 A1 Nov. 8, 2018

(51) Int. Cl.
*H04L 12/58* (2006.01)
*H04L 29/08* (2006.01)

(52) U.S. Cl.
CPC ............ *H04L 51/32* (2013.01); *H04L 51/063* (2013.01); *H04L 51/12* (2013.01); *H04L 51/24* (2013.01); *H04L 67/10* (2013.01); *H04L 67/22* (2013.01); *H04L 67/306* (2013.01)

(58) Field of Classification Search
CPC combination set(s) only.
See application file for complete search history.

(56) References Cited

U.S. PATENT DOCUMENTS

| 8,874,670 | B2 | 10/2014 | Gupta et al. |
| 9,088,533 | B1 * | 7/2015 | Zeng ............... G06Q 10/107 |
| 9,088,553 | B1 | 7/2015 | Loc |
| 9,749,272 | B2 | 8/2017 | Piccinini et al. |
| 2003/0139902 | A1 | 7/2003 | Geib et al. |
| 2007/0271336 | A1 | 11/2007 | Ramaswamy |
| 2008/0040184 | A1 | 2/2008 | Cragun et al. |
| 2009/0259718 | A1 | 10/2009 | O'Sullivan et al. |

(Continued)

FOREIGN PATENT DOCUMENTS

| CN | 105204913 A | 12/2015 |
| WO | 2011008886 A1 | 1/2011 |

OTHER PUBLICATIONS

IBM: List of Patents or Patent Applications Treated as Related (Appendix P), Apr. 4, 2018, 2 pgs.

(Continued)

*Primary Examiner* — Abdullahi E Salad
(74) *Attorney, Agent, or Firm* — Erik K. Johnson

(57) ABSTRACT

Disclosed aspects relate to obtainability management in a social networking environment. A set of target recipients of a message may be detected in the social networking environment. A set of obtainability data may be ascertained with respect to the set of target recipients using the social networking environment. A message modification action may be determined using the set of obtainability data with respect to the set of target recipients. The message modification action may be performed in the social networking environment.

19 Claims, 8 Drawing Sheets

(56) References Cited

U.S. PATENT DOCUMENTS

| | | | |
|---|---|---|---|
| 2010/0121849 A1 | 5/2010 | Goeldi | |
| 2011/0307403 A1 | 12/2011 | Rostampour et al. | |
| 2011/0314397 A1 | 12/2011 | Ogle et al. | |
| 2012/0158630 A1 | 6/2012 | Zaman et al. | |
| 2012/0166532 A1 | 6/2012 | Juan et al. | |
| 2013/0018955 A1 | 1/2013 | Thaxton et al. | |
| 2014/0040406 A1* | 2/2014 | Ollila | G06F 3/0237 709/206 |
| 2014/0229407 A1* | 8/2014 | White | G06N 99/005 706/12 |
| 2015/0195234 A1 | 7/2015 | Bell et al. | |
| 2015/0269155 A1 | 9/2015 | Bastide et al. | |
| 2016/0087924 A1* | 3/2016 | Ramalingam | H04L 51/22 709/206 |
| 2016/0255166 A1* | 9/2016 | Piccinini | H04L 51/22 709/206 |
| 2017/0142211 A1* | 5/2017 | Shaw | H04L 67/24 |

OTHER PUBLICATIONS

U.S. Appl. No. 15/790,338, entitled "Obtainability Management in a Social Networking Environment", filed Oct. 23, 2017, 48 Pages.

Pickens, "Facebook Launches Advanced AI Effort To Find Meaning In Your Posts", http://tech.slashdot.org/story/13/09/21/181239,facebook-launches-advanced-ai-effort-to-find-meaning-in-your-posts, Printed on Apr. 20, 2017, pp. 1-7.

IBM, "IBM Analytics:Advanced Analytics", https://www.ibm.com/analytics/us/en/technology/advanced-analytics/index.html, Printed on Apr. 20, 2017, pp. 1-6.

IBM, "IBM SPSS Statistics", https://www.ibm.com/us-en/marketplace/spss-statistics, Printed on Apr. 20, 2017, pp. 1-5.

Patel, "From aha to oh ****, I'm sharing everything on my journey to 100,000 monthly visitors.", http://neilpatel.com/blog/, May 1, 2017, pp. 1-88.

Sanebox, "SaneBox for Business", https://www.sanebox.com/business, Printed on Apr. 20, 2017, pp. 1-7.

Webex, "Webex—How to create a meeting on behalf of another (delegate permissions)", http://kb.mit.edu/confluence/display/istcontrib/Webex+-+How+to+create+a+meeting+on+behalf+of+another+(delegate+permissions), Printed on Apr. 20, 2017, pp. 1-2.

Wikipedia, "Deep Learning", https://en.wikipedia.org/wiki/Deep_learning, Printed on Apr. 20, 2017, pp. 1-44.

Wikipedia, "Natural Language Processing", https://en.wikipedia.org/wiki/Natural_language_processing, Printed on Apr. 20, 2017, pp. 1-9.

Elbourn, "Social Recommendations API", IBM Connections Developer, https://www-10.lotus.com/ldd/appdevwiki.nsf/xpAPIViewer.xsp?lookupName=APIReference#action=openDocument&res_title=Social_Recommendations_API_ic50&content=apicontent, Jun. 30, 2015, pp. 1-2.

IBM, "IBM SPSS Text Analytics for Surveys", http://www-03.ibm.com/software/products/en/spss-text-analytics-surveys, Printed on Apr. 20, 2017, pp. 1-3.

Cano, et al. "Capturing Entity-Based Semantics Emerging from Personal Awareness Streams", Department of Computer Science, University of Sheffield, Printed on May 1, 2007, pp. 33-44, 1st Workshop on Making Sense of Microposts, #MSM2011, United Kingdom.

Mell et al., "The NIST Definition of Cloud Computing", NIST, Sep. 2011, pp. 1-3, Special Publication 800-145, U.S. Department of Commerce, Gaithersburg, MD.

Fairbanks, "IBM Rave—Rapidly Adaptive Visualization Engine", Cognos User Group Discussion, Apr. 24, 2014, pp. 1-28, US.

* cited by examiner

OBTAINABILITY MANAGEMENT IN A SOCIAL NETWORKING ENVIRONMENT

BACKGROUND

This disclosure relates generally to computer systems and, more particularly, relates to obtainability management in a social networking environment. Social networking environments may facilitate communication between physically separated users.

SUMMARY

An example embodiment may include a system, method and computer program product for modifying the contextual availability of addressees or recipients of a message. An expected message to a user or group of users may be detected. The availability of the user or group of users may be calculated in reference to a topic, natural language, or other elements in the message. An organizational hierarchy analytics view of the user or group of users may be presented in combination with available connections. The addressees or recipients of the message may be modified based on availability. Aspects may enhance the awareness of a user with respect to the status of their message and allow the user to take action or have actions taken on their behalf to facilitate the objective for their message.

An example embodiment may include a system, method and computer program product for obtainability management in a social networking environment. A set of target recipients of a message may be detected in the social networking environment. A set of obtainability data may be ascertained with respect to the set of target recipients using the social networking environment. A message modification action may be determined using the set of obtainability data with respect to the set of target recipients. The message modification action may be performed in the social networking environment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
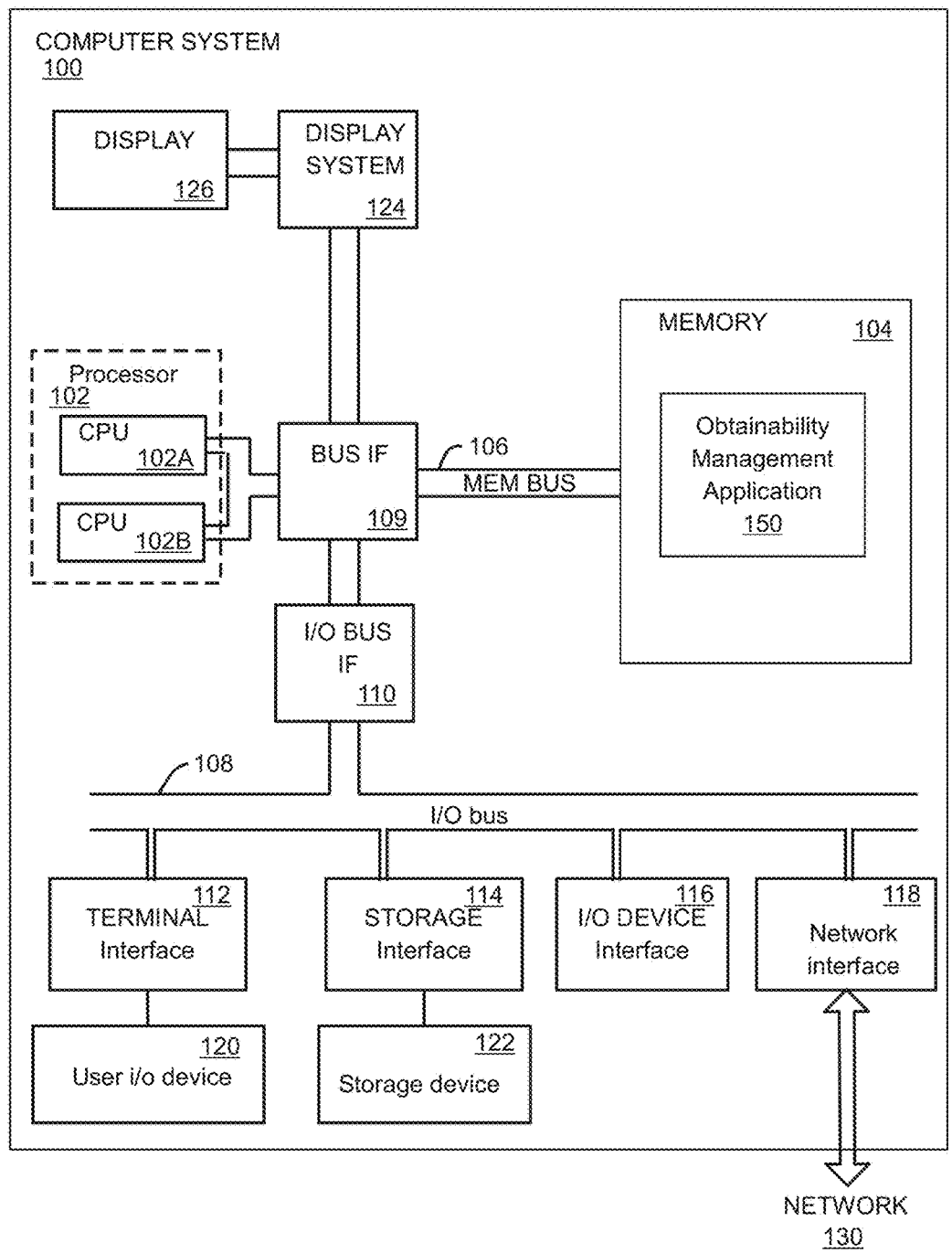
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to modifying the contextual availability of addressees or recipients of a message. An expected message to a user or group of users may be detected. The availability of the user or group of users may be calculated in reference to a topic, natural language, or other elements in the message. An organizational hierarchy analytics view of the user or group of users may be presented in combination with available connections. The addressees or recipients of the message may be modified based on availability. Aspects may enhance the awareness of a user with respect to the status of their message and allow the user to take action or have actions taken on their behalf to facilitate the objective for their message.

Social networking environments may be used to connect people and information in logical and organized ways to enable sharing and processing of information between users. The inbox, wall, activity stream, timeline, profile, or the like may enable a user to rapidly share information with and gather information from other users in the network. Not all messages may be answered, and the original sender may not know if the recipient was busy, out-of-office, on vacation, or the like. The message may not be answered until another recipient can be identified. It may be desired to enhance the experience of identifying a correct recipient for a conversation. Obtainability management in a social networking environment may modify the contextual availability of addressees/recipients.

The potential availability of a user may be calculated based on a pending message/communication. The potential availability may be visually represented as an availability graph such that additional related users may be selected by the author/sender. Based on the message, existing characteristics of the recipients/addressees may be calculated in order to select an appropriate user to represent the original intended recipient/addressee. These characteristics may be presented to the author/sender in a user interface such as a graph or chart. Obtainability management may be useful in bridging the gap between the original sender and a delegate who may be able to continue the conversation or provide an appropriate answer while the original recipient is away or busy.

Aspects of the disclosure relate to a system, method, and computer program product for obtainability management in a social networking environment. A set of target recipients of a message may be detected in the social networking environment. A set of obtainability data may be ascertained with respect to the set of target recipients using the social networking environment. A message modification action may be determined using the set of obtainability data with respect to the set of target recipients. The message modification action may be performed in the social networking environment.

In embodiments, the set of possible recipients of a message may be modified to perform the message modification action. Features of a message and its possible recipients may be collected and determined. In various embodiments, features may include circumstance information, content of a message, or relationships between users. In various embodiments, characteristics of possible recipients may be collected as well as historical context regarding the content of a message. In certain embodiments, possible recipients may be selected based on number of mentions, frequency of activity, expected response time, and the like. In embodiments, a model such as a chart or graph may be constructed in order to visually display connections between users/possible recipients. Altogether, aspects of the disclosure may have performance or efficiency benefits. Aspects may save resources such as network bandwidth, time, processing, or memory. As an example, time may be saved, and a user experience may be improved, by performing a message modification action such as modifying the set of possible recipients. This may prevent a user from having to manually modify the list of recipients or manually search for other appropriate recipients, as well as allow a message response to be achieved/received quickly. Other examples of saving time using obtainability management in a social networking environment may also be possible.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store an obtainability management application 150. In embodiments, the obtainability management application 150 may include instructions or statements that execute on the processor 102 or instructions or statements that are interpreted by instructions or statements that execute on the processor 102 to carry out the functions as further described below. In certain embodiments, the obtainability management application 150 is implemented in hardware via semiconductor devices, chips, logical gates, circuits, circuit cards, and/or other physical hardware devices in lieu of, or in addition to, a processor-based system. In embodiments, the obtainability management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
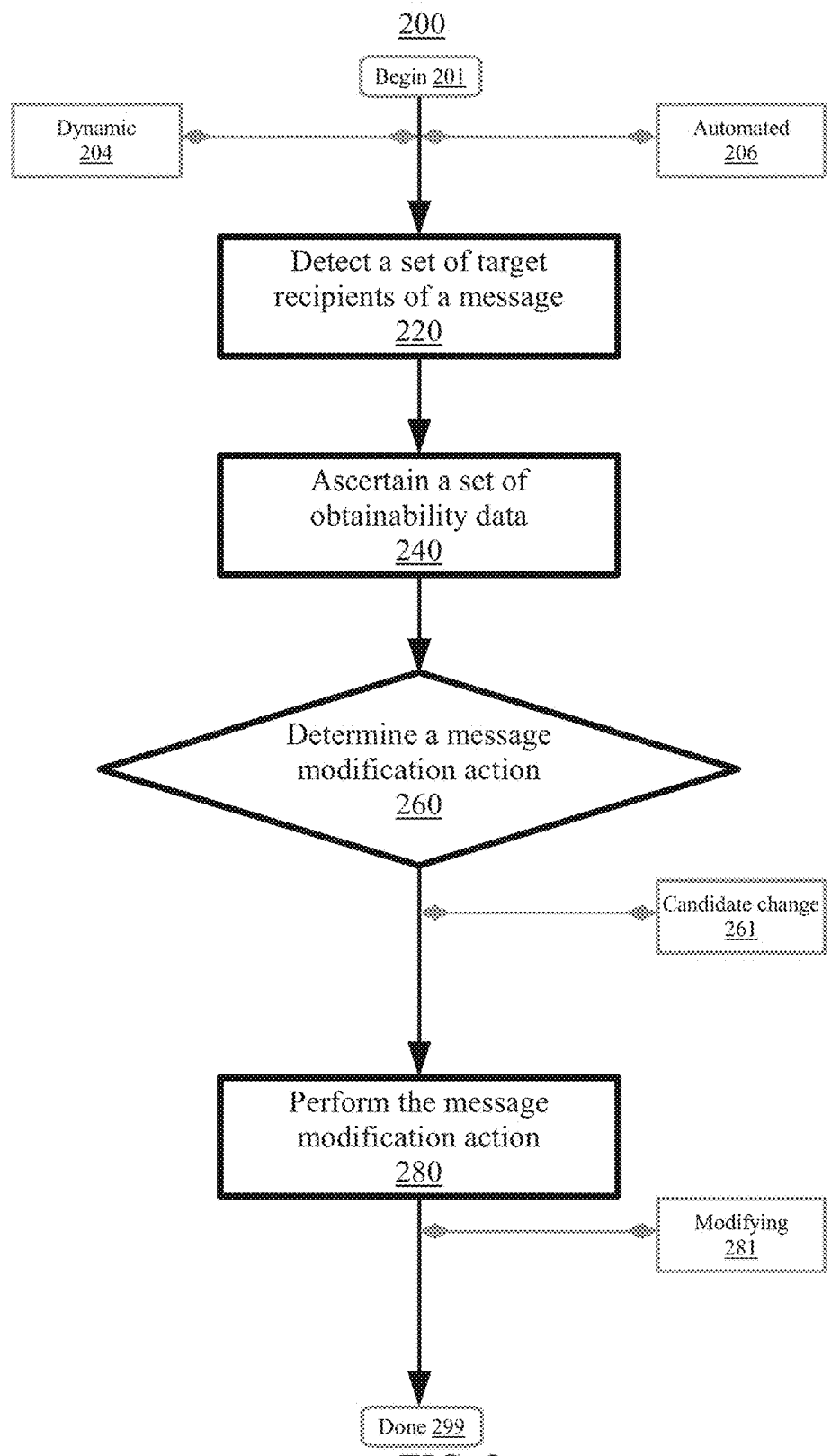
FIG. 2 is a flowchart illustrating a method for obtainability management in a social networking environment, according to embodiments.

FIG. 2 is a flowchart illustrating a method 200 for obtainability management in a social networking environment, according to embodiments. Aspects of FIG. 2 relate to calculating the potential availability of a user in a social networking environment. Generally, social networking environments can include platforms that offer communication tools to facilitate the sharing of information, ideas, pictures, video, messages, and other data between a community of users. As examples, social networking environments may include one or more of instant messaging platforms (e.g., chat service), short messaging services (e.g., text messaging), social communities (e.g., micro-blog, professional connections, photo-sharing, other groups of users), newsfeeds (e.g., interface for reception and display news events and activity data), email platforms (e.g., internet or other network-based messaging tool), calendars (e.g., shared calendar platform), wiki, community (e.g., micro-blog, professional connections, photo-sharing), product reviews (e.g., collection of user reviews), project collaborations (e.g., a group of users working together on a task), or the like. The method 200 may begin at block 201.

In embodiments, the detecting, the ascertaining, the determining, the performing, and the other steps described herein may each be executed in a dynamic fashion at block 204. The steps described herein may be executed in a dynamic fashion to streamline obtainability management in the social networking environment. The set of operational steps may occur in real-time, ongoing, or on-the-fly. One or more of the operational steps described herein may be carried-out in an ongoing basis to facilitate, promote, or enhance obtainability management in a social networking environment. As an example, the obtainability status of a user may be updated in an ongoing fashion. The obtainability status of a user may change from "available" to "unavailable" in real-time as the user boards an airplane for a vacation. Other examples may also be possible.

In embodiments, the detecting, the ascertaining, the determining, the performing, and the other steps described herein may each be executed in an automated fashion at block 206. The steps described herein may be executed in an automated fashion without user intervention. The operational steps may each occur in an automated fashion without user intervention or manual action (e.g., using automated computer machinery, fully machine-driven without manual stimuli). The automated operational steps may be performed by firmware or the like. As an example, the appropriate set of recipients for a message may be established by automated computer machinery without manual input. Other examples may also be possible.

At block 220, a set of target recipients of a message may be detected. The detecting may be performed in the social networking environment. The set of target recipients may include a grouping/list of addressees of a message from a source/originating user. The set of target recipients may include social networking friends/followers, coworkers, collaborators, users/audience of a website/blog, or the like. Generally, detecting can include sensing, identifying, recognizing, discerning, discovering, or otherwise distinguishing a set of target recipients of a message. The set of target recipients may be sensed in response to a triggering event (e.g., the opening of a new message window, the opening of a social networking application, the sending of a message) or a user input (e.g., entering message content, entering a list of recipients). The set of target recipients may be detected automatically (e.g., without manual intervention) by the obtainability management engine. The set of target recipients may be extracted from an expected, anticipated, or drafted message (e.g., TO, CC, BCC). The message may be a reply to an initial or different message in a thread.

Consider the following example. User A may wish to send a message to coworkers B, C, and D regarding an important deadline for a project. User A may open a new message window and begin typing, adding Users B, C, and D to the recipient list. In this scenario, the set of target recipients of the message includes Users B, C, and D. In another example, Users A, B, C, and D may already have an established message thread for this project. User A may wish to reply to the last message in the thread. User A may hit the reply button and begin typing. Users B, C, and D may be automatically added to the recipient list based on their involvement in the message thread. The set of target recipients of the message includes Users B, C, and D. Other examples of detecting a set of target recipients of a message may also be possible.

At block 240, a set of obtainability data may be ascertained. Generally, ascertaining can include determining, resolving, computing, formulating, or identifying. The set of obtainability data may relate to the set of target recipients in the social networking environment. The set of obtainability data may relate to availability of a user (e.g., away, out of office, via a calendar application), accessibility (e.g., pertaining to capability of accessing a necessary resource such as a closed network computer), reachability (e.g., in case of emergency), approachability (e.g., pertaining to physical location), ability to get an approval/solution/answer, or the like. The set of obtainability data may include any delegates of the recipient user (e.g., in case the recipient user is unable to respond). In embodiments, the set of target recipients may be analyzed, compared, mapped, evaluated, or examined in order to ascertain a set of obtainability data. As an example, the availability of a user or group of users may be calculated. In embodiments, such a calculation may be in reference to a topic, natural language, or other elements in the message.

Consider the following example. In the example described herein, obtainability data may be collected for Users B, C, and D. User B may have an automated "out of office" response to messages, indicating that User B will not be able to reply to messages for the next two days. This may cause a problem if the deadline for the project is within two days. A response may be needed from User B before they return to the office. Additional obtainability data for User B may indicate two delegates, Users E and F, who may be able to respond to messages while User B is out of office. The obtainability data for User E may indicate that User E can answer messages pertaining to a Subject Area 1 while the obtainability data for User F may indicate that User F can answer messages pertaining to Subject Areas 2 and 3. Based on the context of the message (e.g., subject line, key words), it may be determined that the message from User A falls into Subject Area 2. Other examples of ascertaining a set of obtainability data may also be possible.

At block 260, a message modification action may be determined. Generally, determining can include computing, formulating, identifying, resolving, calculating, or ascertaining. The message modification action may include an operation, executed step, or process that alters, changes, adjusts, or influences one or more aspects of a message such as the set of target recipients of the message. The message modification action may include, for example, changing or modifying the recipients (e.g., adding a user or group of users to the set of target recipients), a temporal element (e.g., when to send/post), a platform/venue for the post (e.g., which message board/email thread), a set of contents (e.g., to desensitize the material, send only a portion of it, send more details to be more descriptive, include a different type of request), a change in nature of the message (e.g., from a request for approval type-message to a for-your-information type-message), or the like. The determining may be performed using the set of obtainability data with respect to the set of target recipients. The set of obtainability data may be analyzed, compared, or evaluated with respect to one or more thresholds, benchmarks, or equilibrium points to determine the message modification action. For example, an evaluation may be performed on the set of obtainability data. The set of obtainability data may be compared with various statistical measures (e.g., benchmarks, variances, deviations, clustering) to ascertain how the set of obtainability data relates to a calculated norm. As another example, the set of obtainability data may be analyzed with respect to a baseline level of obtainability. Other examples may also be possible.

In embodiments, a candidate change of the set of target recipients of the message may be provided at block 261. Providing can include presenting, alerting, transmitting, sending, displaying, conveying, or delivering. The providing may be performed via a pop-up bubble/textbox (e.g., "suggested recipients"), a message, an audio notification (e.g., beeping), a change in color/font/font size, an icon (e.g., profile picture appearing), or the like. The candidate change may include a suggested/requested modification to the set of target recipients. In embodiments, an actual modification of the message may only occur after the recipient/addressee or the sender confirms the change. As an example, a user may select the candidate change or a portion of the candidate change as a desired modification to the set of target recipients. In certain embodiments, the sender may not approve of the candidate change of the set of target recipients and may wish to generate/select another message modification action. The providing may be performed based on and in response to determining the message modification action and to perform the message modification action.

Consider the following example. In the example described herein, User B may be out of office and delegate message response to Users E and F. Based on the time-sensitive element of the message (e.g., a deadline) and the length of time User B is expected to be out of office, it may be determined that a message modification action is necessary to meet the deadline. It may be desired to contact a delegate of User B in order to obtain a response before the deadline. Obtainability data for Users E and F may be analyzed. As described herein, User F may be authorized to response to messages regarding Subject Area 2, which matches the content of the message from User A. Based on the content match (e.g., within a threshold), it may be determined that User F should be added to the recipient list in order to meet the deadline for the project. It may be determined to automatically add User F to the recipient list (e.g., changing the recipient list) by the obtainability management engine without manual intervention from User A. Other examples of determining a message modification action and providing a candidate change of the set of target recipients may also be possible.

At block 280, the message modification action may be performed in the social networking environment. The message modification action may be derived from the set of availability data for the set of target recipients in order to contact an appropriate user or delegate user for a response to the message. Generally, performing can include implementing, carrying-out, instantiating, or executing the message modification action. Performing the message modification action can include adding an auxiliary recipient (e.g., delegate, secondary recipient, manager, coworker, associate), sending the message to the auxiliary recipient, allowing an auxiliary recipient access to content data of the message, or the like.

In embodiments, the set of target recipients of the message may be modified at block 281. Modifying can include adjusting, altering, revising, or changing the set of target recipients. The set of target recipients of the message may be modified to perform the message modification action. The addressees of the message may be modified based on availability or obtainability. As an example, a key recipient user in an existing email thread may be out of office due to a vacation. The set of target recipients may be modified/adjusted to add a replacement or substitute delegate for the absent recipient user. In embodiments, the modification may be performed automatically (e.g., without user intervention) by the obtainability management engine. In certain embodiments, the modification may occur after the addressee or sender confirms (e.g., in response to a candidate change being presented/selected).

Consider the following example. In the example described herein, it may be determined to modify the recipient list of the message by adding User F to the thread in order to meet the deadline. The obtainability management engine may automatically add User F to the message thread without manual intervention from User A. When User A hits the send/reply button, the message may be sent to Users B, C, D, and F. In certain examples, the message modification action may include removing User B from the recipient list. When User A hits the send/reply button, the message may be sent to Users C, D, and F while excluding User B, who is out of office. Other examples of performing a message modification action and modifying the set of target recipients may also be possible.

Method 200 concludes at block 299. Aspects of method 200 may provide performance or efficiency benefits related to obtainability management in a social networking environment. Aspects may save resources such as bandwidth, processing, or memory. As an example, bandwidth may be saved by automatically performing a message modification action. This may prevent a sender from repeatedly checking/monitoring the social networking environment for the availability of the intended recipient. Instead, the message may be automatically sent to a delegate of the absent recipient. Preventing the sender from monitoring the social networking environment may result in reduced bandwidth usage. Other examples of saving bandwidth using obtainability management may also be possible.

Figure 3:
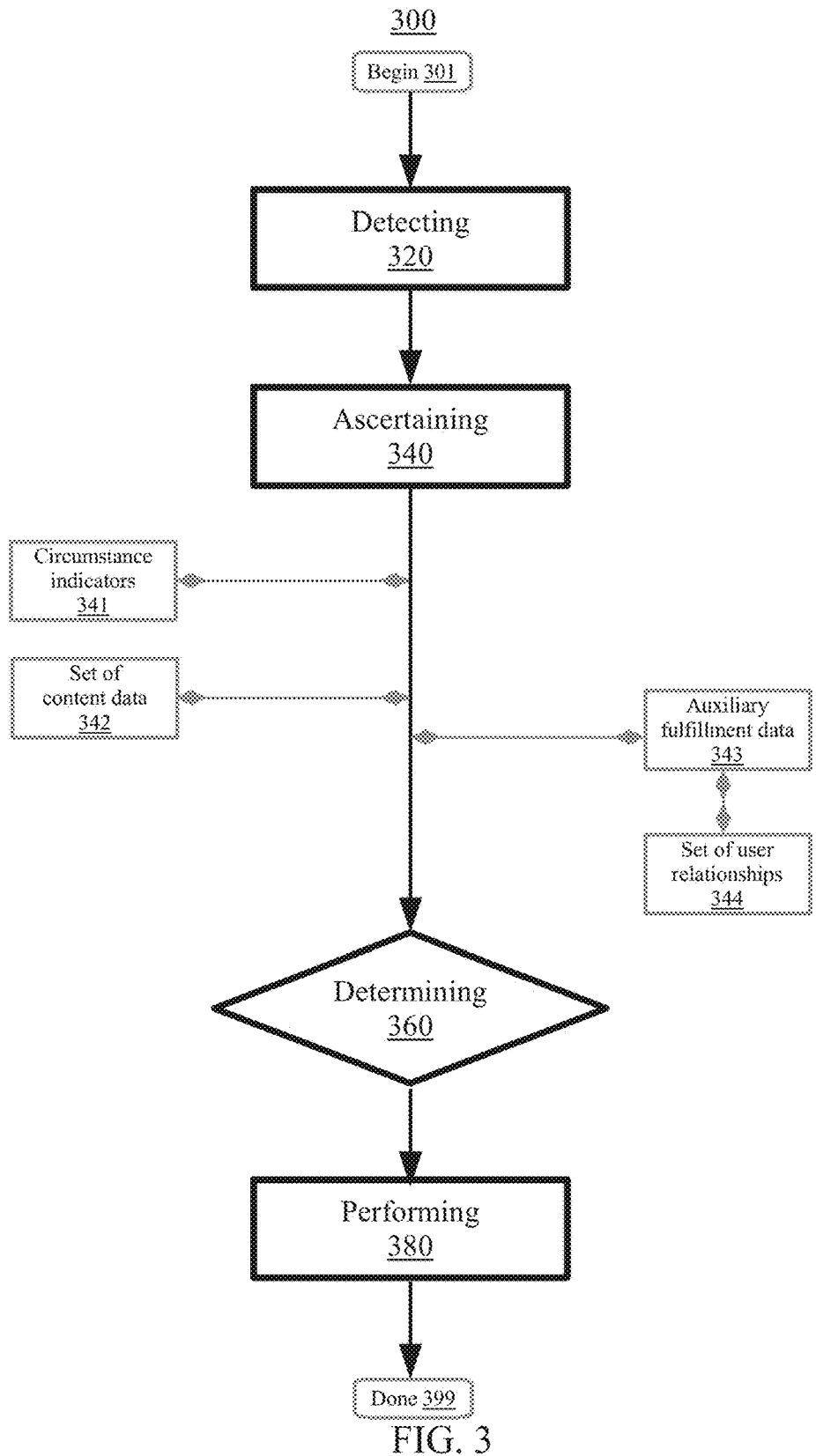
FIG. 3 is a flowchart illustrating a method for obtainability management in a social networking environment, according to embodiments.

FIG. 3 is a flowchart illustrating a method 300 for obtainability management in a social networking environment, according to embodiments. Aspects of method 300 may be similar or the same as aspects of method 200, and aspects may be utilized interchangeably. The method 300 may begin at block 301. At block 320, a set of target recipients of a message may be detected. The detecting may be performed in the social networking environment. At block 340, a set of obtainability data may be ascertained. The set of obtainability data may relate to the set of target recipients. The ascertaining may be performed using the social networking environment.

In embodiments, a set of circumstance indicators may be determined at block 341. Determining can include formulating, computing, resolving, ascertaining, generating, or establishing. The set of circumstance indicators may include a signal of the situation, condition, or position of a (possible) recipient user. The circumstances may include challenges (e.g., out of office, hiking in the wilderness, on a cruise ship, broken arm, in a different time zone), statuses (e.g., on vacation, offline, taking care of ill relative), situations, environments, or the like. The circumstances may be indicated via a color (e.g., green for available, red for not available), text (e.g., "out of office"), icon (e.g., an X for unavailable, a check mark for available), sound (e.g., beeping sound when the desired recipient is online), or the like. The set of circumstance indicators may relate to one or more message recipient response activities, including what the recipient does with the message (e.g., if they reply, when they reply, how they reply). As an example, a specific indicator may be designated to alert a sender when the addressee logs on to their social networking environment while a different specific indicator may be designated to alert a sender when the delegate of the addressee logs on to their social networking environment. The determining may be performed based on the set of obtainability data with respect to the set of target recipients. The set of circumstance indicators may be provided in the social networking environment. Providing can include transmitting, conveying, presenting, displaying, highlighting, or indicating. In embodiments, an organizational hierarchy analytics view of the group of users may be presented in combination with the available connections. Other provided views of the set of circumstance indicators may also be possible.

Consider the following example. In a healthcare environment, a patient may wish to send a message to their doctor regarding a medical concern using a social networking environment. The patient may not realize that the doctor is on vacation for the week and is unable to respond to any messages. The obtainability management engine may implement a set of circumstance indicators in order to provide the patient with information about the status of their message. As an example, the profile picture of the doctor may be tinted red to indicate to the patient that the doctor is out of office. An "X" may appear next to the name of the doctor in the recipient list for the message. A text bubble/pop-up may appear with the text "Doctor is on vacation for Y amount of days." The patient may desire to contact another medical professional with their concern. The profile picture of the nurse practitioner may be tinted green, a check mark may appear next to their name, or a text bubble/pop-up may appear with the text "Available for messages" to indicate that they are available to respond to the questions of the patient. Other examples of determining and providing a set of circumstance indicators may also be possible.

In embodiments, a set of content data for the message may be determined at block 342. Determining can include formulating, computing, resolving, ascertaining, calculating, or establishing. The set of content data may include information derived from the message with respect to the subject matter of the message. The determining may be performed using the set of obtainability data with respect to the set of target recipients. The content of the message may be analyzed, compared, mapped, evaluated, or examined in order to determine the set of content data. In embodiments, the set of content data may be determined based on natural language elements, such as syntax (e.g., sentence structure, phrases, complete sentences), part of speech (e.g., nouns, verbs, adjectives, adverbs), complexity (e.g., computational complexity, linguistic complexity), character count (e.g., fifty characters, two hundred characters), grammar (e.g., grammatical errors, correct grammar, a threshold number of grammatical errors), spelling (e.g., spelling errors, no spelling errors, a threshold number of spelling errors), mentions (e.g., tagging a friend, tagging a webpage, tagging a location), quantitative values (e.g., 100, 50%, $30), hashtags (e.g., indicating a trending topic), language (e.g., English, Spanish, Chinese), or the like. In embodiments, the set of content data may be collected from the subject line of a message or based on key words located in a message. In certain embodiments, the set of content data may be collected from past text, such as replies in a string of correspondence via messages.

The set of content data for the message may be established. Establishing can include initiating, instantiating, determining, resolving, or identifying. The establishing may be performed in the social networking environment to perform the message modification action. In embodiments, the message may be tailored based on the actual recipients (e.g., instead of based on the originally intended recipient). As an example, material may require being desensitized (e.g., removing personal information). In other situations, elements may be removed from the message (e.g., removing attachments, pictures, sentences). Information (e.g., media, video, audio, still images, hyperlinks) in a message may be secure and a delegate user may not have the same level of access/clearance as the original desired addressee. In other situations, content may be added to the message. An auxiliary user may not be as involved in a project as the original recipient and may require more information. The content of a message may be modified based on who/when it is being sent.

Consider the following example. A government organization may utilize an obtainability management engine. A User A may wish to send a message to a User B with content that requires full security clearance. The content may include still images and hyperlinks that only coworkers with full security clearance may be allowed to access. The secure content may be collected and indicated in the message. User B may be unavailable to respond to the message and may delegate User C to answer messages. However, User C may only have partial security clearance. The content of the message may be modified based on the clearance level of User C. As an example, the still images and hyperlinks may be blocked, locked, or removed from the message from User A. Other examples of determining and establishing a set of content data may also be possible.

In embodiments, the set of obtainability data may be configured to include a set of auxiliary fulfillment data with respect to the set of target recipients at block 343. Generally, configuring can include setting-up, programming, adjusting, revising, modifying, or structuring. Auxiliary fulfillment data may include information related to possible delegated users of an addressee. In embodiments, an unavailable addressee may delegate another user (e.g., auxiliary user) or group of users to answer particular messages. The auxiliary user may include a user who may be able to respond to the message in place of the addressee, such as a secondary user (e.g., assistant, lower in the hierarchy), manager user (e.g., higher in the hierarchy), or similar user (e.g., same level in hierarchy). The auxiliary fulfillment data may include temporal data (e.g., when the auxiliary user might be able to respond), hierarchical level (e.g., level of security clearance of the auxiliary user, job level of the auxiliary user), or the like. A first obtainability status of a first target recipient may be detected. Detecting can include sensing, recognizing, identifying, discovering, or ascertaining. The first obtainability status of a first target recipient may include the level of availability/reachability/accessibility of the first target recipient (e.g., addressee, auxiliary user). The obtainability status may include a status (e.g., available, partially available, unavailable), a temporal element (e.g., when the user is expected to be available), or the like.

The first obtainability status may be compared with a threshold obtainability. Comparing can include contrasting, evaluating, analyzing, correlating, or examining. The threshold obtainability may include an average/acceptable/appropriate level of obtainability for the recipient user/addressee. The threshold obtainability may relate to a needed/desired timeline for an answer, the needed/desired level of detail for an answer, or the like. The threshold obtainability may include a number (e.g., 5 out of 10, 70 out of 100), percentage (e.g., 55% obtainability), time period (e.g., expected response time of 4 minutes), clearance level (e.g., full clearance), status (e.g., partially available), or the like. The threshold obtainability may be predetermined, input by a user, or machine-learned based on user activity. It may be computed that the first obtainability status of the first target recipient does not achieve the threshold obtainability. Computing may include calculating, evaluating, formulating, or determined. It may be calculated that the response would not be achieved in time, the response may not be satisfactory (e.g., not have the appropriate/desired level of approval/detail), or the like. As an example, the threshold obtainability may require that the recipient has full clearance access but the recipient only has partial clearance access. As another example, it may be desired that the recipient can respond within an hour but the recipient may require/desire three hours to answer the message. Other examples may also be possible.

An auxiliary recipient may be determined based on the set of auxiliary fulfillment data. Determining may include computing, resolving, ascertaining, generating, or establishing. As described herein, the auxiliary recipient may include a user delegated by the original addressee to answer messages (e.g., secondary user, manager user, similar user). In embodiments, a database of delegates may be searched for an appropriate auxiliary user based on desired auxiliary fulfillment. In certain embodiments, an out-of-office message may be queried to determine/indicate a delegate/delegates. A hierarchical organizational structure may be analyzed to compute a delegate/contact (e.g., up the hierarchy, down the hierarchy, same level) based on the level of importance of the message. The message may be structured to include the auxiliary recipient to achieve the threshold obtainability. The structuring may be performed in the social networking environment. Structuring may include configuring, arranging, constructing, or organizing. In embodiments, the auxiliary recipient may be added to the message in order to achieve the threshold obtainability. In certain embodiments, the message may be forwarded or automatically sent to the auxiliary recipient. As an example, the assistant of an addressee may be able to quickly respond (e.g., within a threshold time) to a message while the addressee is on vacation. The message may be automatically sent to the assistant in order to receive an answer within the threshold amount of time. Other examples may also be possible.

Consider the following example. An architecture firm, an engineering firm, and a construction company may be working together on a project and frequently communicate. Architect A may be on vacation as an important deadline is nearing. Auxiliary fulfillment data may be collected for the architecture firm. While Architect A is on vacation, Architects B and C may be able to respond to messages regarding this project. Architect B may be on the same hierarchical level as Architect A, but may generally take two days to respond to messages. Architect C may be on a lower hierarchical level, but may only take one hour to respond to messages. When Architect A leaves for vacation, the obtainability status of "vacation: 7 days" may be collected. The engineering firm and construction company may need a response to a question within 5 days (e.g., a threshold level of obtainability). The obtainability status of Architect A may be compared to the threshold and it may be computed that a response would not be achieved in the desired time period. It may be determined to find an auxiliary recipient/delegate for Architect A so that the response will be received within 5 days. Since Architect B has a similar job/level within the firm, it may be determined to add Architect B to the message thread. In another example, a response may be needed by the end of the day (e.g., threshold obtainability of 8 hours). It may be determined that Architects A and B are not appropriate recipients for the message since it would take them 7 and 2 days (respectively) to respond to the message. It may be determined to add Architect C to the message thread, since Architect C is a specified delegate and can respond within the threshold obtainability. Other examples of using auxiliary fulfillment data to determine an auxiliary recipient may also be possible.

In embodiments, the set of auxiliary fulfillment data may be configured to include a set of user relationships at block 344. Configuring can include organizing, arranging, constructing, or structuring. The set of user relationships may relate to a chain or web of relevant candidate recipients (e.g., target/auxiliary recipients) and how they are connected. As an example, User A may have an auxiliary recipient User B, which may be indicated in the chain/web. User A may also have a superior/manager recipient User C, which may also be indicated in the chain/web. Other examples may also be possible. The set of user relationships may have a set of matching capabilities related to a set of tasks. Matching capabilities may include a level of similarity between two or more recipients (e.g., identical, within a threshold match). The matching capabilities may be indicated as a value (e.g., 7 out of 10), a percentage (e.g., 70% match), a star rating (e.g., 3 out of 5 stars), or the like. The matching capabilities may be calculated/identified with respect to a set of tasks such as skills, talents, authority to take action, ability to provide authorization, jobs, projects, topics, subject matter, or the like. As an example, the president of a department in a company may have a higher matching capability with the vice president than with a specific subject matter expert. Other examples may also be possible.

The auxiliary recipient may be determined based on the set of user relationships having the set of matching capabilities related to the set of tasks. Determining can include identifying, computing, resolving, selecting, formulating, or ascertaining. The set of user relationships may be analyzed, compared, or evaluated with respect to one or more thresholds, benchmarks, or equilibrium points to determine the auxiliary recipient. For example, an evaluation may be performed on the set of user relationships. The set of user relationships may be compared with various statistical measures (e.g., benchmarks, variances, deviations, clustering) to ascertain how the set of user relationships relates to a calculated norm. As an example, the matching capability may be compared to a threshold matching capability. If the matching capability achieves or exceeds the threshold, a candidate auxiliary recipient may be determined as an actual auxiliary recipient. As another example, the set of user relationships may be analyzed with respect to a baseline level of matching capability. An average level of matching/similarity needed/desired to achieve a sufficient message response may be predetermined/calculated. Auxiliary recipients who exceed the baseline level of matching may be chosen as possible auxiliary recipients and displayed to the user. Other examples may also be possible.

Consider the following example. A client may wish to send a message to their insurance agent, Agent A, who may be out of office for two weeks. The client may wish to contact another agent while Agent A is out of office. A set of user relationships may be collected for Agent A and other agents within the company. Agents B and C may be considered as auxiliary recipients for the message. Agent B may have a similar job title to Agent A and have similar skills and authority regarding claims and questions from clients. Agent B may have a matching capability of 80% with Agent A. The matching capability may be compared to a threshold (e.g., 60% match). Since the matching capability of Agent B exceeds the threshold matching capability, Agent B may be determined as an appropriate auxiliary recipient for the message from the client. In another example, Agent C may have the same job title as Agent A and have even more similar skills and authority regarding claims and questions from clients. Agent C may have a matching capability of 88% with Agent A. The matching capabilities of Agents B and C may be compared and it may be determined that Agent C is a better match for Agent A. Agent C may be determined as the appropriate auxiliary recipient for the message from the client. Other examples of using a set of user relationships to determine the auxiliary recipient may also be possible.

At block 360, a message modification action may be determined. The determining may be performed using the set of obtainability data with respect to the set of target recipients. At block 380, the message modification action may be performed in the social networking environment. Method 300 concludes at block 399. Aspects of method 300 may provide performance or efficiency benefits related to obtainability management in a social networking environment. Aspects may save resources such as bandwidth, processing, or memory. As an example, determining an auxiliary recipient based on the set of auxiliary fulfillment data may save bandwidth. Automatically determining an appropriate auxiliary recipient for a message (e.g., without manual action) may prevent a sender/user from having to send multiple messages (e.g., to less appropriate auxiliary recipients) in order to receive an answer to their message, which may require additional bandwidth than the automated aspects described herein. Other examples of saving bandwidth using obtainability management may also be possible.

Figure 4:
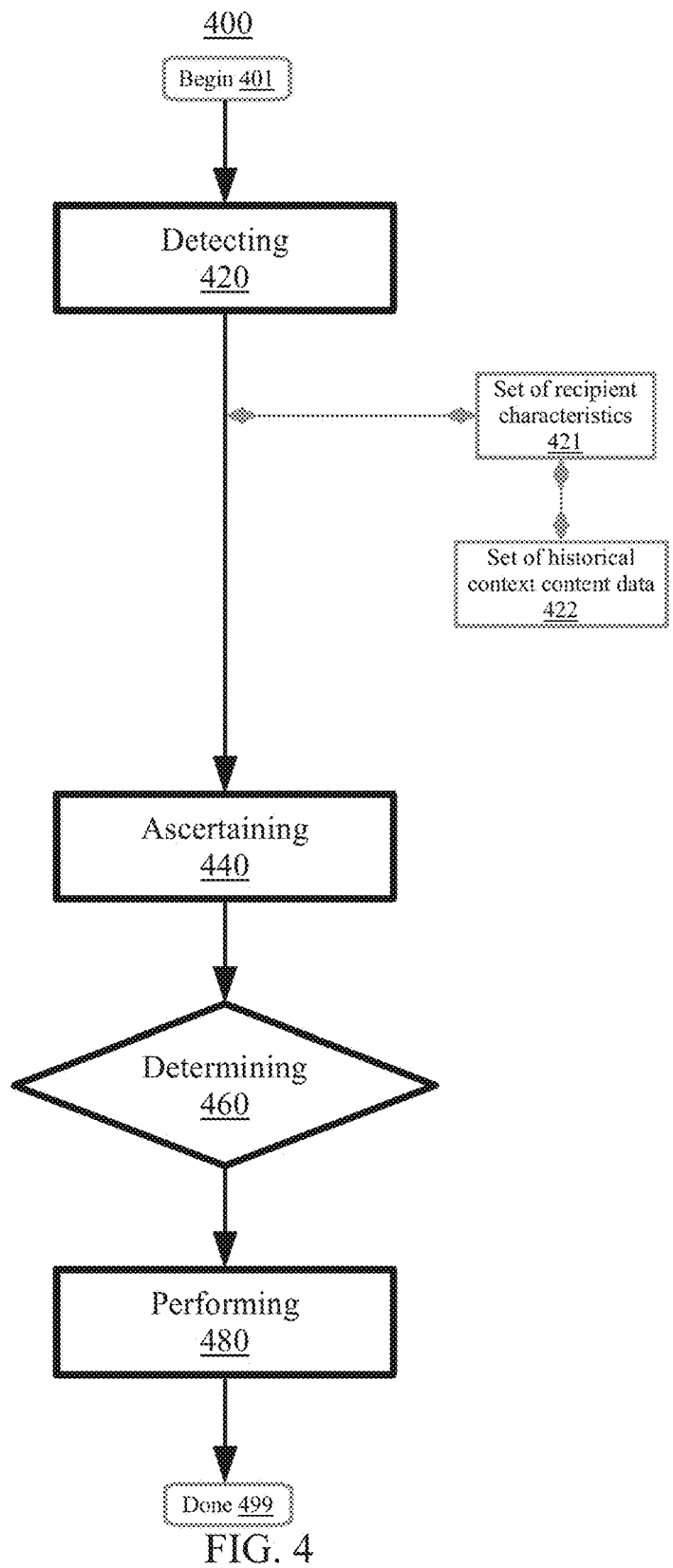
FIG. 4 is a flowchart illustrating a method for obtainability management in a social networking environment, according to embodiments.

FIG. 4 is a flowchart illustrating a method 400 for obtainability management in a social networking environment, according to embodiments. Aspects of method 400 may be similar or the same as aspects of method 200/300, and aspects may be utilized interchangeably. The method 400 may begin at block 401. At block 420, a set of target recipients of a message may be detected. The detecting may be performed in the social networking environment. At block 440, a set of obtainability data may be ascertained. The set of obtainability data may relate to the set of target recipients. The ascertaining may be performed using the social networking environment. At block 460, a message modification action may be determined. The determining may be performed using the set of obtainability data with respect to the set of target recipients. At block 480, the message modification action may be performed in the social networking environment.

In embodiments, a set of recipient characteristics may be identified at block 421. Identifying can include detecting, sensing, recognizing, discerning, or distinguishing. The identifying may pertain to the set of target recipients of the message. The set of recipient characteristics may include features, attributes, properties, elements, or the like related to a possible target recipient. The set of recipient characteristics may include a recipient domain (e.g., entity the recipient works for), mentions (e.g., indicating level of importance to the project), prior senders (e.g., in a chain of email responses), and the like. The set of target recipients may be extracted from the message (e.g., mail message, social networking message) from distribution lists such as TO, CC, BCC, domain, attachments, and the like. The extraction may be performed for analysis of the group membership/ownership. In various embodiments, references to prior conversations may be extracted from the message to identify recipient characteristics. Mentions or references to users may be added to the list and tallied/counted. As an example, User A may be mentioned four times and may have a count of 4 while User B may only be mentioned twice and may have a count of 2. In certain embodiments, groups may be expanded such that each user is appropriately represented. In certain embodiments, groups may be treated as individual entities when presented.

The message modification action may be determined based on the set of recipient characteristics. Determining may include computing, formulating, identifying, resolving, selecting, calculating, or ascertaining the message modification action as described herein. The set of recipient characteristics may be analyzed, compared, or evaluated with respect to one or more thresholds, benchmarks, or equilibrium points to determine the message modification action. For example, an evaluation may be performed on the set of recipient characteristics. The set of recipient characteristics may be compared with various statistical measures (e.g., benchmarks, variances, deviations, clustering) to ascertain how the set of recipient characteristics relates to a calculated norm. As an example, the set of recipient characteristics may be compared to a threshold number of mentions. If the recipient characteristics for a particular auxiliary recipient achieve a threshold number of mentions, the message modification action may include adding the particular recipient to the message or forwarding the message to the particular recipient. Other examples may also be possible.

Consider the following example. A group of students may use an instant messaging social networking environment to collaborate on a project. A set of recipient characteristics may be collected for each of the four students. As an example, a number of mentions may be collected for each of the students from the instant messaging conversation. Student A may have ten mentions, Student B may have seven, Student C may have twelve, and Student D may have six. Student B may have a question for Student C and send an instant message. However, Student C may have logged offline for the night. Since Student A has the next highest number of mentions, Student A may be determined as an auxiliary recipient for Student C. The message modification action may include adding Student A to the instant message chat. Other examples of identifying a set of recipient characteristics to determine the message modification action may also be possible.

In embodiments, a set of historical context content data may be sensed at block 422. Sensing can include detecting, distinguishing, identifying, or discovering. The set of historical context content data may include prior/previous/historical information pertaining to the message. The set of historical context content data may include the thread the message belongs to, a previous message, a history of the project/task/job (e.g., may be in a different thread/environment/system/software application), patterns of replies, mentions, hashtags, quantitative values, or the like. In embodiments, the set of historical context content data may be extracted from a user input. A natural language processing technique may be utilized to extract information from messages. Keywords, hashtags, mentions, or other elements may be analyzed to establish the set of historical context content data. In certain embodiments, the set of historical context content data may be sensed in response to a triggering event (e.g., opening a new message/application) or sensed automatically (e.g., without manual intervention) by the obtainability management engine. The set of recipient characteristics may be identified based on the set of historical context content data. Identifying can include detecting, distinguishing, discovering, or ascertaining. The set of recipient characteristics may relate to/be based on the sensed set of historical context content data.

Consider the following example. In the group project example described herein, a chain of instant messages may be analyzed with respect to historical context content data. Keywords, patterns, and mentions may be collected from the (previous messages in the) thread in order to establish the set of recipient characteristics. As an example, keywords such as "leader" or "in charge" may be extracted from IMs, and it may be determined that Student C is considered the leader of the group. This may be indicated in the set of recipient characteristics. As described herein, Student C may also have a higher number of mentions than Students A, B, and D, which may also be indicated in the set of recipient characteristics. Patterns of responses may also be analyzed. As an example, Student C may begin the chat every day and delegate tasks/responsibilities to the other students, who respond within a half hour with confirmations. This pattern may also be indicated in the set of recipient characteristics, which (as described herein) may be utilized to determine a message modification action. Other examples of using a set of historical context content data to identify the set of recipient characteristics may also be possible.

Method 400 concludes at block 499. Aspects of method 400 may provide performance or efficiency benefits related to obtainability management in a social networking environment. Aspects may save resources such as bandwidth, processing, or memory. As an example, bandwidth may be saved by automatically extracting recipient characteristics/historical context content data from prior messages. This may prevent a sender/user from having to search message threads for an appropriate auxiliary user to send the message to, which may require additional bandwidth than the automated aspects described herein. Other examples of saving bandwidth using obtainability management may also be possible.

Figure 5:
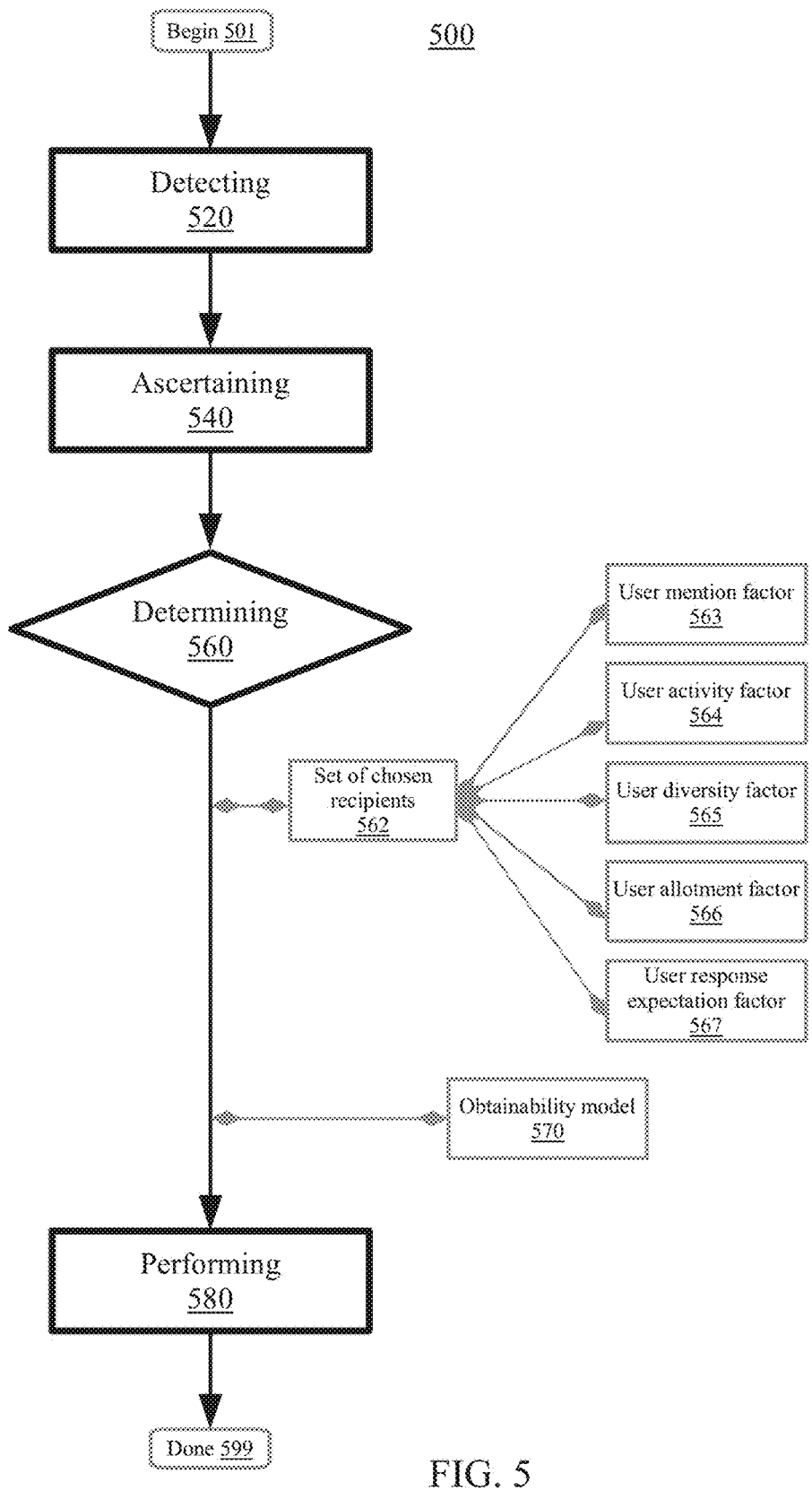
FIG. 5 is a flowchart illustrating a method for obtainability management in a social networking environment, according to embodiments.

FIG. 5 is a flowchart illustrating a method 500 for obtainability management in a social networking environment, according to embodiments. Aspects of method 500 may be similar or the same as aspects of method 200/300/400, and aspects may be utilized interchangeably. The method 500 may begin at block 501. At block 520, a set of target recipients of a message may be detected. The detecting may be performed in the social networking environment. At block 540, a set of obtainability data may be ascertained. The set of obtainability data may relate to the set of target recipients. The ascertaining may be performed using the social networking environment. At block 560, a message modification action may be determined. The determining may be performed using the set of obtainability data with respect to the set of target recipients.

In embodiments, the message modification action may be configured to include selecting a set of chosen recipients at block 562. Configuring can include organizing, arranging, constructing, or structuring. The set of chosen recipients can include a group of candidate auxiliary recipients (e.g., including the actual auxiliary recipient) who have been determined/calculated as appropriate for the message. The set of chosen recipients may be selected based on a set of recipient selection criteria. Selecting can include determining, identifying, resolving, or establishing. As an example, selecting can include saving a data value, transmitting a data object (e.g., sending an object having metadata), routing a message (e.g., publishing/posting), or providing/performing/processing an operation (e.g., a notification). Features which describe the context of the message may be evaluated and utilized to select the chosen recipients. Evaluated features may include a user mention factor, a user activity factor, a user diversity factor, a user allotment factor, a user response expectation factor, or the like. In various embodiments, users may be assigned scores based on different features/factors, which may be utilized to determine an auxiliary user.

In embodiments, the set of recipient selection criteria may be structured to include a user mention factor at block 563. Structuring can include arranging, organizing, constructing, or configuring. The user mention factor may include the number of times a candidate auxiliary recipient appears on the thread, message, historical context content data, or the like. As described herein, a mention count may be extracted/calculated, and the user with the higher count may be selected as the appropriate auxiliary user. As an example, User A may be mentioned 8 times in the thread while User B may be mentioned 10 times in the thread. Since User B has a higher mention count than User A, User B may be selected as the appropriate auxiliary user. Other examples of a user mention factor may also be possible.

In embodiments, the set of recipient selection criteria may be structured to include a user activity factor at block 564. Structuring can include arranging, organizing, constructing, or configuring. The user activity factor may include the frequency of activity in the conversation history included in the message. Possible activities may include comments, likes, reshares, responses, replies, or the like. The user activity factor may also include how often a user accesses (e.g., reads/writes) the message/message thread. The number of unread messages of a user may be detected and compared to a benchmark/standard/threshold. A higher user activity factor may indicate a greater likelihood to respond (appropriately/quickly) to a message. As a result, a user with a higher user activity factor may be selected as an auxiliary user. As an example, User A may have commented three times while User B may have only commented once. User A may be a more appropriate auxiliary user. As another example, User A may have ten unread messages while User B only has two. User B may be a more appropriate auxiliary user. Other examples of a user activity factor may also be possible.

In embodiments, the set of recipient selection criteria may be structured to include a user diversity factor at block 565. Structuring can include arranging, organizing, constructing, or configuring. The user diversity factor may include uniqueness of a user in the message thread. Dissimilar/unique users may have a higher diversity factor and may be more likely to be selected as an auxiliary user. Users may be selected based on uniqueness of the components in the message address, such as name, location, or company. It may be desired to select a representative user from each location/company in the message thread. As an example, an architecture firm, an engineering firm, and a construction company may be working together on a project and utilize an email thread to communicate. It may be desired to include at least one architect, one engineer, and one construction work in the message thread. If the architect is busy/out of office, another architect may be selected as an auxiliary user based on user diversity. Other examples of a user diversity factor may also be possible.

In embodiments, the set of recipient selection criteria may be structured to include a user allotment factor at block 566. Structuring can include arranging, organizing, constructing, or configuring. The user allotment factor may include an available space/number of users for the message. The user allotment factor may include a target/threshold (e.g., desired, ceiling/maximum, floor/minimum) number of recipients (e.g., 10), a target number of recipients of various subject matter expertise (e.g., two experts in X and three experts in Y), or the like. The user allotment factor may be predetermined, input by a user, machine-learned, or based on available space (e.g., could change/vary by project/message thread/social networking platform). Up to a threshold number of users may be selected for presentation of the message. As an example, the message may require at least four different users. If one user is absent/out of office, an auxiliary user may be selected and added to the message thread based on a user allotment factor (e.g., a minimum of four). Other examples of a user allotment factor may also be possible.

In embodiments, the set of recipient selection criteria may be structured to include a user response expectation factor at block 567. Structuring can include arranging, organizing, constructing, or configuring. The user response expectation factor may include a temporal/time-related feature of a message. The user response expectation factor may include whether or not a user is expected to respond in time (e.g., need a response in one hour but a user needs three hours to respond). Temporal thresholds may be utilized with respect to availability, accessibility, reachability, or the like. The user response expectation factor may be calculated based on the last time a user read the message, the number of unread messages for a user, an average response time from a user, a user input for an out of office time, or the like. As an example, a user may generally/on average take three hours to respond to a message. A particular message may have a deadline and may need/require/desire a response within the next hour. A different user (e.g., who takes less time to reply to messages) may be selected as the auxiliary user based on the deadline. Other examples of a user response expectation factor may also be possible.

Consider the following example. A group of coworkers (Users A and B) may be involved in a project. User A may wish to send a message via a reply in a thread regarding the project to User B. User B may be out of office and may delegate message responses to other users C, D, and E. It may be desired to select a set of recipients for the message from User A. The set of recipients for the message may be selected from Users C, D, and E based on a recipient selection criteria. A number of user mentions may be calculated/extracted from the thread. User C may have ten mentions, User D may have eight mentions, and User E may have six mentions. Users may be assigned one point for every mention (e.g. C: 10, D: 8, E: 6). A user activity frequency may be calculated/extracted from the thread based on number of replies. User C may have replied five times, User D may have replied seven times, and User E may have replied four times. Users may be assigned one additional point for every reply (e.g., cumulative C: 15, D: 15, E: 10). A user diversity may be extracted from the message. Users C and D may work for the same department and receive zero points but User E may work in a different department and receive two additional points (e.g., cumulative C: 15, D: 15, E: 12).

A user allotment factor may be determined by User A. As an example, User A may wish to only include two recipients in the message (e.g., maximum of two). Based on the user allotment factor, only two of Users C, D, and E may be added to the message. A user response expectation factor may be calculated. As an example, User C may typically take ten minutes to reply to a message, User D may take twenty minutes, and User D may take eight minutes. The users may be ranked (e.g., 1, 2, 3) based on estimated response time and may be assigned a points accordingly (e.g., cumulative C: 15+2=17, D: 15+1=16, E: 12+3=15). Based on the cumulative scores and selection criteria, it may be determined that Users C and D should be added to the message based on greater achievement of the selection criteria than User E. Other examples of selecting the set of chosen recipients based on a set of recipient selection criteria may also be possible.

In embodiments, an obtainability model may be resolved at block 570. Resolving can include determining, formulating, ascertaining, generating, or establishing. The resolving may be performed based on the set of obtainability data with respect to the set of target recipients. The obtainability model may be a graph, chart, chain/web, index, or other visual representation of users/target recipients and their level of obtainability. The obtainability model may be created based on the obtainability data/user selection criteria such as circumstance indicators, content data, auxiliary fulfillment data, recipient characteristics, user relationships, historical context content data, user mentions, user activity, user diversity, user allotment, user response expectation, and the like. Various connections between users may be translated to nodes-edges. As an example, if User A and User B are connected users, this may be translated as ["node": "User A", "type": "connected", "node": "User B"]. The graph layout may have a data structure of parent-child relationships. Features of the message which are used as nodes in the graph may be highlighted/enlarged/marked to indicate contextual/direct significance. Connecting nodes which are smaller/un-highlighted/unmarked may indicate an indirect significance. The obtainability model may be provided in the social networking environment. Providing may include presenting to the user, transmitting, conveying, displaying, sending, or generating. The graph may be provided after sending a message, before sending a message, when the user wants to check on the message, when the user clicks an icon/presses a button, or the like. The graph/prior calculations of the network may be saved for future processing.

Consider the following example. In the example described herein, Users C, D, and E may be delegates for User B, who is out of office while receiving a message from User A. A graph layout may be created based on the connections and obtainability of Users A, B, C, D, and E. An edge may connect Users A and B to represent sending the message. Additional edges may connect User B with Users C, D, and E, since they are auxiliary recipients for User B. In certain embodiments, Users C, D, and E may have additional edges to connect to their auxiliary recipients and so on. The nodes representing Users C and D may be enlarged, highlighted, or marked to indicate to User A that they should be contacted in place of User B. The nodes representing Users B and E may be reduced, un-highlighted, or unmarked to indicate an unavailable/unobtainable status. As an example, Users C and D may appear in green while Users B and E may appear in red. As another example, the edges connected to Users C and D may be bolded while the edges connected to Users B and E may be dashed lines. When User A clicks the icon/presses the button to view the graph, the visual representation may allow User A to easily determine Users C and D as appropriate recipients for the message. Other examples of resolving and providing an obtainability model may also be possible.

At block 580, the message modification action may be performed in the social networking environment. Method 500 concludes at block 599. Aspects of method 500 may provide performance or efficiency benefits related to obtainability management in a social networking environment. Aspects may save resources such as bandwidth, processing, or memory. As an example, processing may be saved using an obtainability model. An obtainability model may provide a user with connections between other users/recipients automatically (e.g., without user input/intervention). The obtainability model may also be saved for future use in the network (e.g., connections will not need to be calculated again). Automatically computing and saving the obtainability model may require less processing than manually determining connections between users every time the network is used. Other examples of saving processing using obtainability management may also be possible.

Figure 6:
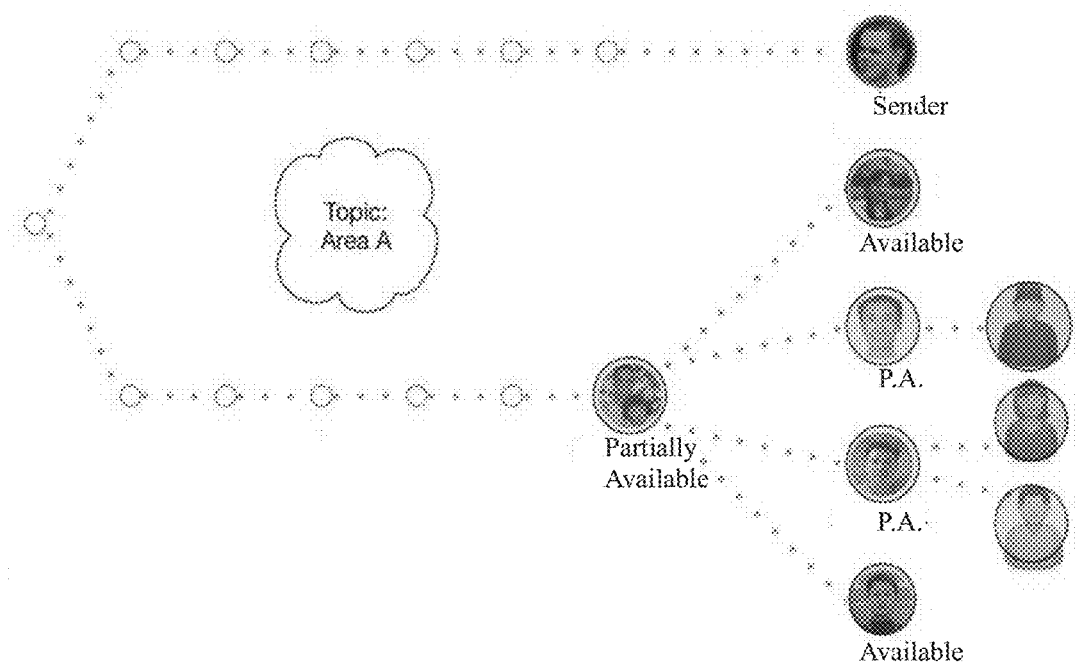
FIG. 6 illustrates an example of obtainability management in a social networking environment, according to embodiments.

FIG. 6 illustrates an example of obtainability management in a social networking environment, according to embodiments. Obtainability management may be used with collaboration systems and social networking systems. The collaboration data may include authors, editors, readers, followers, and the like. Collaboration data may be searched for based on relevant users. The user may activate the organizational hierarchy analytics by clicking on the user interface (e.g., icon/menu), automatic activation based on familiarity to the users, or sufficient numbers of users in the message. Users may be extracted from the message (e.g., via the TO, CC, BCC). References to prior conversations (e.g., messages in a thread) may be extracted. Features which describe the context of the message may be evaluated. These features may include highest counts for users, addition to the mail thread, frequency of activity in conversation history, uniqueness of the components in the notes address, components of the domain, or the like. Up to a threshold number of users may be selected for presentation of the message. The obtainability management engine may query the connections from each user for the selected users and translate the connections to nodes-edges. Data may be converted to nodes-edges such that a graph layout is established. The graph layout may highlight (e.g., enlarge) the features of the message which are used as nodes in the graph to mark contextual/direct significance. The graph layout may be presented to the user. Other examples may also be possible.

Consider the following example. User A may compose a message for issue to Users B, C, and D. Two addressees (User B and C) may be detected as absent. An alert icon may appear to User A to indicate the absences of one or more addressees. User A may click the icon/button to show the organizational hierarchy analytics view. The view may indicate that User B delegates a User E and User F for messages of this particular topic. User F may also be absent, but may delegate work to User G. The view may suggest User E as a better candidate for the message. The view may also show that User C and the delegates of User C are absent. However, a User H may be similar to User C and may be able to assist User A by responding to the message. User A may select Users E and H in the view and add them to the recipient list before sending the message. Other examples may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
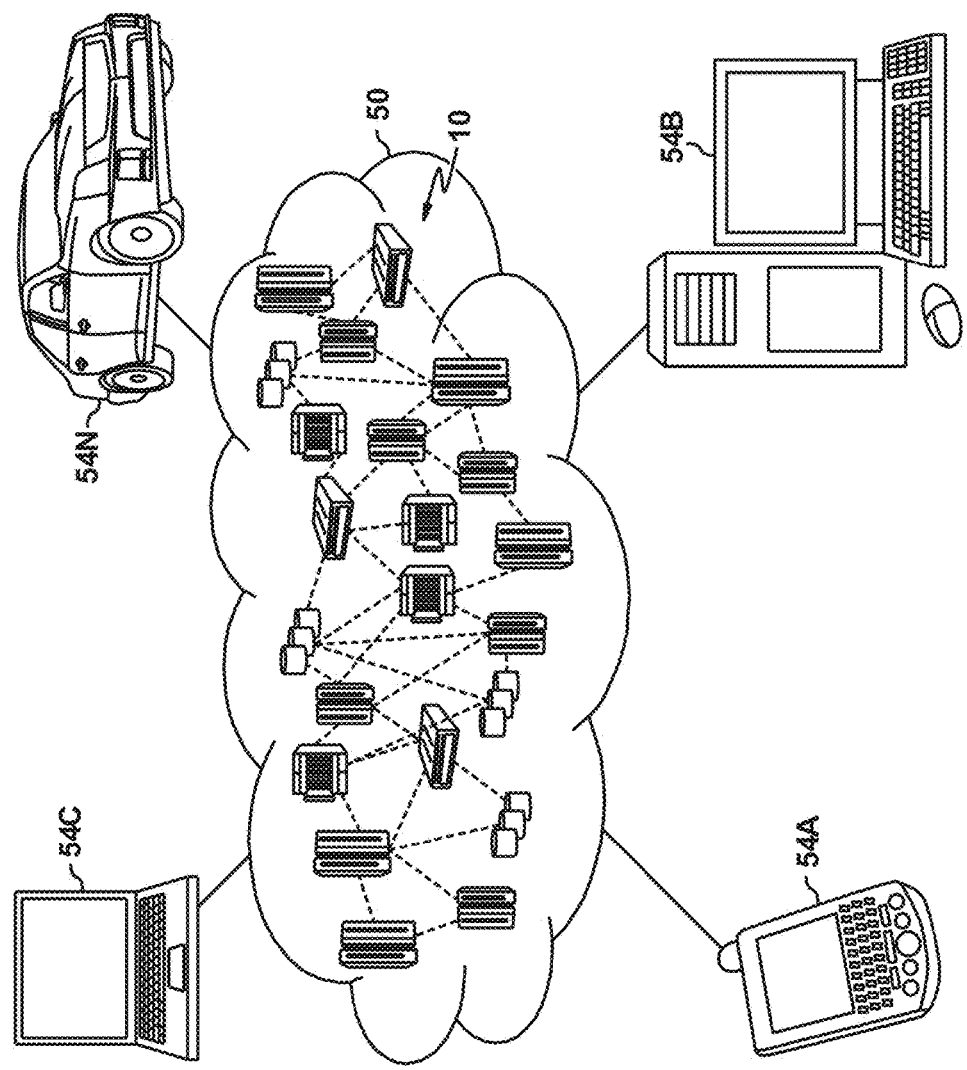
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
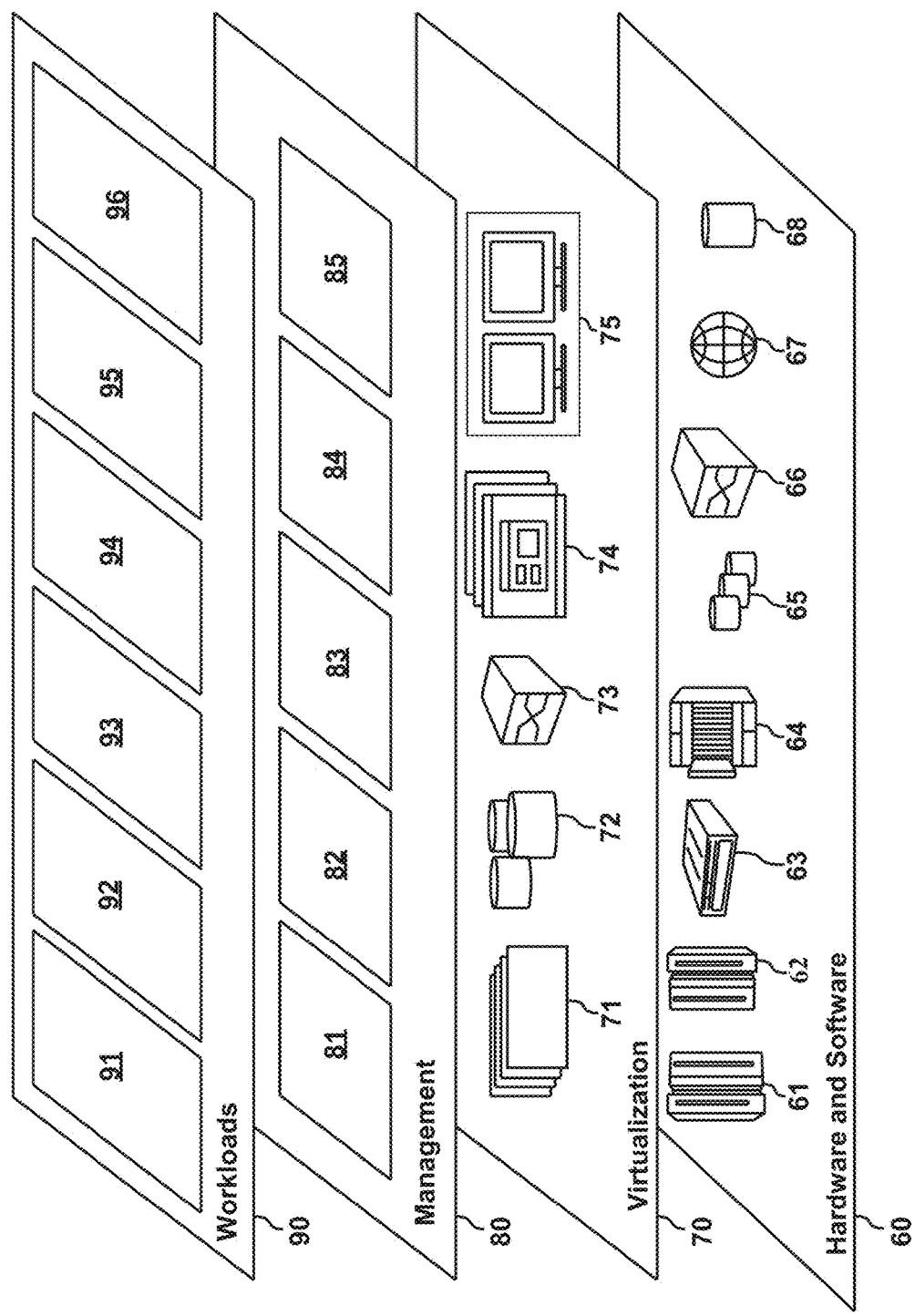
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and obtainability management program 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for obtainability management in a social networking environment, the method comprising:
  detecting, in the social networking environment, a set of target recipients of a message;
  ascertaining, using the social networking environment, a set of obtainability data with respect to the set of target recipients;
  determining, using the set of obtainability data with respect to the set of target recipients, a message modification action;
  configuring the set of obtainability data to include a set of auxiliary fulfillment data with respect to the set of target recipients;
  detecting a first obtainability status of a first target recipient;
  comparing the first obtainability status with a threshold obtainability;
  computing that the first obtainability status of the first target recipient does not achieve the threshold obtainability;
  determining, based on the set of auxiliary fulfillment data, an auxiliary recipient; and structuring, in the social networking environment, the message to include the auxiliary recipient to achieve the threshold obtainability; and performing, in the social networking environment, the message modification action.

2. The method of claim 1, further comprising:
providing, based on and in response to determining the message modification action and to perform the message modification action, a candidate change of the set of target recipients of the message.

3. The method of claim 1, further comprising:
modifying, to perform the message modification action, the set of target recipients of the message.

4. The method of claim 1, further comprising:
determining, based on the set of obtainability data with respect to the set of target recipients, a set of circumstance indicators related to one or more message recipient response activities; and
providing, in the social networking environment, the set of circumstance indicators.

5. The method of claim 1, further comprising:
determining, using the set of obtainability data with respect to the set of target recipients, a set of content data for the message; and
establishing, in the social networking environment to perform the message modification action, the set of content data for the message.

6. The method of claim 1, further comprising:
configuring the set of auxiliary fulfillment data to include a set of user relationships having a set of matching capabilities related to a set of tasks; and
determining, based on the set of user relationships having the set of matching capabilities related to the set of tasks, the auxiliary recipient.

7. The method of claim 1, further comprising:
identifying, pertaining to the set of target recipients of the message, a set of recipient characteristics; and
determining, based on the set of recipient characteristics, the message modification action.

8. The method of claim 7, further comprising:
sensing a set of historical context content data which pertains to the message; and
identifying, based on the set of historical context content data, the set of recipient characteristics.

9. The method of claim 1, further comprising:
configuring the message modification action to include selecting a set of chosen recipients; and
selecting, based on a set of recipient selection criteria, the set of chosen recipients.

10. The method of claim 9, further comprising:
structuring the set of recipient selection criteria to include a user mention factor.

11. The method of claim 9, further comprising:
structuring the set of recipient selection criteria to include a user activity factor.

12. The method of claim 9, further comprising:
structuring the set of recipient selection criteria to include a user diversity factor.

13. The method of claim 9, further comprising:
structuring the set of recipient selection criteria to include a user allotment factor.

14. The method of claim 9, further comprising:
structuring the set of recipient selection criteria to include a user response expectation factor.

15. The method of claim 1, further comprising:
resolving, based on the set of obtainability data with respect to the set of target recipients, an obtainability model; and
providing, in the social networking environment, the obtainability model.

16. The method of claim 1, further comprising:
executing, in a dynamic fashion to streamline obtainability management in the social networking environment, each of:
the detecting, the ascertaining, the determining, and the performing.

17. The method of claim 1, further comprising:
executing, in an automated fashion without user intervention, each of:
the detecting, the ascertaining, the determining, and the performing.

18. A system for obtainability management, the system comprising:
a memory having a set of computer readable computer instructions, and
a processor for executing the set of computer readable instructions, the set of computer readable instructions including:
detecting, in the social networking environment, a set of target recipients of a message;
ascertaining, using the social networking environment, a set of obtainability data with respect to the set of target recipients;
determining, using the set of obtainability data with respect to the set of target recipients, a message modification action;
configuring the set of obtainability data to include a set of auxiliary fulfillment data with respect to the set of target recipients;
detecting a first obtainability status of a first target recipient
comparing the first obtainability status with a threshold obtainability;
computing that the first obtainability status of the first target recipient does not achieve the threshold obtainability;
determining, based on the set of auxiliary fulfillment data, an auxiliary recipient; and
structuring, in the social networking environment, the message to include the auxiliary recipient to achieve the threshold obtainability; and
performing, in the social networking environment, the message modification action.

19. A computer program product for obtainability management, the computer program product comprising a computer readable storage medium having program instructions embodied therewith, wherein the computer readable storage medium is not a transitory signal per se, the program instructions executable by a processor to cause the processor to perform a method comprising:
detecting, in the social networking environment, a set of target recipients of a message;
ascertaining, using the social networking environment, a set of obtainability data with respect to the set of target recipients;
determining, using the set of obtainability data with respect to the set of target recipients, a message modification action;
configuring the set of obtainability data to include a set of auxiliary fulfillment data with respect to the set of target recipients;

detecting a first obtainability status of a first target recipient;
comparing the first obtainability status with a threshold obtainability;
computing that the first obtainability status of the first target recipient does not achieve the threshold obtainability;
determining, based on the set of auxiliary fulfillment data, an auxiliary recipient; and
structuring, in the social networking environment, the message to include the auxiliary recipient to achieve the threshold obtainability; and
performing, in the social networking environment, the message modification action.

\* \* \* \* \*